（12）United States Patent
Wang et al.

(10) Patent No.: US 10,386,454 B2
(45) Date of Patent: Aug. 20, 2019

(54) NETWORK CENTRIC LOCALIZATION FOR DETERMINING THE LOCATION OF MOBILE DEVICES

(71) Applicant: SIGNIFY HOLDING B.V., Eindhoven (NL)

(72) Inventors: Xiangyu Wang, Eindhoven (NL); Armand Michel Marie Lelkens, Heerlen (NL); Jan Hendrik Poesse, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 441 days.

(21) Appl. No.: 15/117,299

(22) PCT Filed: Feb. 9, 2015

(86) PCT No.: PCT/EP2015/052573
§ 371 (c)(1),
(2) Date: Aug. 8, 2016

(87) PCT Pub. No.: WO2015/118135
PCT Pub. Date: Aug. 13, 2015

(65) Prior Publication Data
US 2016/0349353 A1 Dec. 1, 2016

(30) Foreign Application Priority Data
Feb. 7, 2014 (EP) .................................. 14154306

(51) Int. Cl.
*G01S 5/14* (2006.01)
*G01S 5/06* (2006.01)
*G01S 5/02* (2010.01)

(52) U.S. Cl.
CPC ............... *G01S 5/14* (2013.01); *G01S 5/02* (2013.01); *G01S 5/0221* (2013.01); *G01S 5/0252* (2013.01); *G01S 5/06* (2013.01)

(58) Field of Classification Search
CPC ..... G01S 5/14; G01S 5/02; G01S 5/06; G01S 5/0252; G01S 5/0221; G01S 1/00;
(Continued)

(56) References Cited

U.S. PATENT DOCUMENTS

| | | | |
|---|---|---|---|
| 3,518,674 A | 6/1970 | Moorehead et al. | |
| 6,745,036 B1 | 6/2004 | Dunne et al. | |
| 7,203,497 B2 * | 4/2007 | Belcea | 455/446 |
| 7,925,274 B2 * | 4/2011 | Anderson et al. | 455/456.1 |
| 8,744,487 B2 * | 6/2014 | Jovicic et al. | 455/456.2 |
| 9,351,112 B2 * | 5/2016 | Smith et al. | H04W 4/02 |

(Continued)

FOREIGN PATENT DOCUMENTS

| | | |
|---|---|---|
| CN | 202816156 U | 3/2013 |
| EP | 2565664 A1 | 3/2013 |

(Continued)

OTHER PUBLICATIONS

Poornachandra Bharat U, et al., "Design of RSSI Threshold Based Routing Protocol for Static Wireless Sensor Networks," U. M.Tech. Stage II Report; 2015 (8 Pages).

*Primary Examiner* — Meless N Zewdu
(74) *Attorney, Agent, or Firm* — Meenakshy Chakravorty

(57) ABSTRACT

A system comprising location server, a localization module and a node manager. The location server comprises a network interface operable to receive measurement reports submitted from a plurality of reference nodes of a location network, each measurement report reporting a measurement of a signal received by a respective one of the reference nodes from a respective one of one or more mobile devices. The localization module is configured to determine a loca- (Continued)

tion of one or more of the mobile devices based on at least some of the plurality of measurement reports. The node manager is configured to control whether and/or when one or more of the plurality of measurement reports are submitted from one or more of the reference nodes, in dependence on a measure of relevance to the determination of the location of one or more of the mobile devices.

13 Claims, 4 Drawing Sheets

(58) Field of Classification Search
CPC .......... G01S 5/04; G01S 1/024; G01S 5/0009; G01S 5/0018; G01S 5/0027; G01S 5/0242; G01S 11/00; G01S 1/02; G01S 5/10; H04W 24/10; H04W 4/02; H04W 4/00; H04W 36/0058; H04W 8/12; H04W 56/0015; H04W 92/00; H04W 92/10; H04W 4/025; H04W 4/029; H04W 40/20; H04W 72/00; H04W 72/085; H04W 72/121; H04W 72/1231; H04W 36/30; H04W 40/125; H04W 88/00; H04W 88/02; H04W 88/08; H04W 24/02; H04W 24/04

See application file for complete search history.

(56) References Cited

U.S. PATENT DOCUMENTS

| | | | |
|---|---|---|---|
| 9,814,015 B2* | 11/2017 | Xiao et al. | H04W 64/003 |
| 2005/0261004 A1 | 11/2005 | Dietrich et al. | |
| 2008/0056125 A1 | 5/2008 | Kneckt et al. | |
| 2008/0161015 A1* | 7/2008 | Maloney et al. | 456/456.1 |
| 2010/0039948 A1* | 2/2010 | Agrawal et al. | 370/252 |
| 2010/0118830 A1 | 5/2010 | Stephenson et al. | |
| 2011/0043358 A1 | 2/2011 | Duggan et al. | |
| 2012/0058733 A1* | 3/2012 | Jovicic et al. | 455/67.11 |
| 2012/0184219 A1* | 7/2012 | Richardson et al. | 455/67.11 |
| 2013/0252620 A1* | 9/2013 | Kobayashi et al. | 455/446 |
| 2013/0342402 A1* | 12/2013 | Pesonen | G01S 5/0294 |
| 2014/0098691 A1* | 4/2014 | Kazimi et al. | H04W 24/10 |
| 2014/0295883 A1* | 10/2014 | Kang et al. | H04W 64/00 |
| 2015/0257121 A1* | 9/2015 | Siomina et al. | H04W 64/003 |

FOREIGN PATENT DOCUMENTS

| | | |
|---|---|---|
| JP | 2002533692 A | 10/2002 |
| JP | 2008016991 A | 1/2008 |
| JP | 2008219084 A | 9/2008 |
| JP | 2011509028 A | 3/2011 |
| WO | 2012042432 A1 | 4/2012 |

* cited by examiner

NETWORK CENTRIC LOCALIZATION FOR DETERMINING THE LOCATION OF MOBILE DEVICES

CROSS-REFERENCE TO PRIOR APPLICATIONS

This application is the U.S. National Phase application under 35 U.S.C. § 371 of International Application No. PCT/EP2015/052573, filed on Feb. 9, 2015, which claims the benefit of European Patent Application No. 14154306.6, filed on Feb. 7, 2014. These applications are hereby incorporated by reference herein.

TECHNICAL FIELD

The present invention relates to a location network for determining the location of a mobile device.

BACKGROUND

In an indoor positioning system, the location of a wireless device such as a mobile user terminal can be determined with respect to a location network comprising multiple anchor radios. These anchors are wireless nodes whose locations are known a priori, typically being recorded in a location database which can be queried to look up the location of a node. The anchor nodes thus act as reference nodes for location. Measurements are taken of the signals transmitted between the mobile device and a plurality of anchor nodes (typically RF signals), for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration, triangulation, and/or a fingerprint based technique (comparing the current measurements to a "fingerprint" of previously sampled measurements taken at known locations throughout the environment). Given the relative location of the mobile terminal and the known locations of the anchor nodes, this in turn allows the location of the mobile device to be determined in more absolute terms, e.g. relative to the globe or a map or floorplan.

As well as indoor positioning, other types of positioning system are also known, such as GPS or other satellite-based positioning systems in which a network of satellites act as the reference nodes. Given signal measurements from a plurality of satellites and knowledge of those satellites' positions, the location of the mobile device may be determined based on similar principles.

The determination of the device's location may be performed according to a "device-centric" approach or a "network-centric" approach. According to a device centric approach, each reference node emits a respective signal which may be referred to as a beacon or beaconing signal. The mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

One application of a positioning system is to automatically provide a wireless mobile device with access to control of a utility such as a lighting system, on condition that the mobile device is found to be located in a particular spatial region or zone associated with the lighting or other utility. For instance, access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments.

SUMMARY

There may be various reasons to choose a network centric approach over a device centric approach, e.g. to reduce the burden on mobile devices, to avoid location spoofing by mobile devices, or because an operator wishes to track the location of the mobile device without having to rely on the mobile devices or their users being explicitly involved.

However, a network centric approach also means that when a location system such as an indoor positioning or navigation system uses many anchor nodes to determine the locations of many mobile devices, at the same time, then a large number of measurement reports will be transmitted from the anchor nodes to the location server. Thus there is a possibility that network congestion could increase beyond acceptable levels when the number of mobile devices and/or the number of anchor nodes becomes relatively high. For instance in wireless location networks, anchor nodes send signal measurement reports to a location server via wireless links which may lead to congestion through the wireless interface.

Until recently anchor nodes or other reference nodes for use in localization have been placed relatively sparsely, and so congestion due to this kind of multiplication effect has not been noticed as an issue. However, it is recognized herein that such issues may increasingly occur as new applications for positioning lead to increased density of anchor nodes and/or mobile devices using the anchor nodes. For instance, if the anchor nodes are integrated in respective luminaires of a lighting system, then the number of anchor nodes would typically be very high, so tracking a large number of mobile devices could well cause severe network congestion. Congestion may also occur in many other types of location network and/or other applications.

The following provides a method and apparatus by which congestion due to such a measurement multiplication effect may be reduced.

According to one aspect disclosed herein, there is provided system comprising a location server, a localization module and a node manager. The location server comprises a network interface operable to receive measurement reports submitted from a plurality of reference nodes of a location network (e.g. anchor nodes), each measurement report reporting a measurement of a signal received by a respective one of the reference nodes from a mobile device or a respective one of a plurality of mobile devices. The localization module is configured to determine a location of one or more of the mobile devices based on at least some of the plurality of measurement reports (given knowledge of the locations of the respective reference nodes). The location module may be implemented in the location server. The node manager is configured to control whether and/or when one or more of the plurality of measurement reports are submitted from one or more of the reference nodes, in dependence on a measure of relevance to the determination of the location of one or more of the mobile devices. The node manager may be implemented in the location server or in one or more individual anchor nodes (e.g. in a distributed fashion in each of some or all of the anchor nodes).

The measure of relevance may be implemented in various ways. One example is a measure of distance of the respective reference node from the respective mobile device, on the basis that closer nodes tend to be more useful in determining the mobile device's location. Distance may for instance be measured based on the signal strength or time of flight of the signal received at the respective reference node from the respective mobile device.

There are also various ways to implement the control based on such measures. For example, in embodiments the control by the node manager may comprise controlling a time at which one or more of the measurement reports are submitted, wherein the time depends on the measure of relevance. This way the submission of the one or more measurement reports from the reference node(s) to the location server may be staggered in time relative to the submission of one or more others of the measurement reports, reducing congestion or at least the probability of congestion. This control may be performed by delaying the time at which one or more of the measurement reports are submitted. In embodiments the delay may be inversely related to the measure of relevance. E.g. the delay may be inversely proportional to the measure of relevance, or inversely related according to some other relationship (i.e. any relationship whereby a report from a node considered less relevant is given a longer delay and vice versa).

As another example, the control by the node manager may comprises suppressing reports from ones of said reference nodes for which the measure of relevance is not beyond a threshold, e.g. not outside a threshold on a measure of distance such as a threshold signal strength or time of flight (i.e. indicating greater than a certain distance).

As another example of determining relevance, the reference nodes may be divided into geographical groups, and said measure of relevance may comprises an identification as to which group the respective reference node belongs to.

In such embodiments, the control by the node manager may comprise determining a most relevant one of said reference nodes, identifying the geographic group of said most relevant reference node, and suppressing the submission of measurement reports from reference nodes not belonging to the identified group (relative to the measurement reports from the reference nodes that do belong to said identified group). For instance, the measure of relevance may comprises both a measure of distance of the respective reference node from the respective mobile device (e.g. based on signal strength or time of flight) and the identification of geographic group; and the control by the node manager may comprise determining a closest one of said reference nodes based on the measure of distance, identifying the geographic group of said closest reference node, and suppressing the submission of measurement reports from reference nodes not belonging to the identified group (again relative to the measurement reports from the reference nodes of said identified).

In another example, the measure of relevance may comprise determining that the location module already has a sufficient number of said measurement reports to determine the location of one of said one or more mobile devices to a desired accuracy. In this case the control by the node manager may comprise: in response to determining that the location module has the sufficient number of measurement reports, suppressing the submission of subsequent ones of said measurement reports reporting measurements of signals from said one of the mobile devices.

In yet another example, the node manager may be configured to predict a path and thereby a future location of one of said one or more mobile devices, the measure of relevance comprising a measure of relevance to the future location and the node manager being configured to perform said control in dependence on the measure of relevance to the future location.

According to another aspect disclosed herein, there is provided a computer program product for use in relation to a location network where measurement reports can be submitted from a plurality of reference nodes to a location server, each measurement report reporting a measurement of a signal received by one of the reference nodes from one of one or more mobile devices, and where the location server determines a location of one or more of the mobile devices based on at least some of said plurality of measurement reports. The computer program product comprises code embodied on a computer readable storage medium and configured so as when executed on the location server or on one or more of the reference nodes to perform operations of: controlling whether and/or when one or more of said plurality of measurement reports are submitted from one or more of the reference nodes, in dependence on a measure of relevance to said determination of the location of one or more of the mobile devices.

According to another aspect disclosed herein, there is provided one of a plurality of reference nodes for use in a location network where measurement reports can be submitted from the plurality of reference nodes to a location server, each measurement report reporting a measurement of a signal received by one of the reference nodes from one of one or more mobile devices, and where the location server determines a location of one or more of the mobile devices based on at least some of said plurality of measurement reports. Said one of the reference nodes comprises a node manager configured to control whether and/or when one or more of the measurement reports are submitted from said one of the reference nodes, in dependence on a measure of relevance to said determination of the location of one or more of the mobile devices.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF EMBODIMENTS

Figure 1:
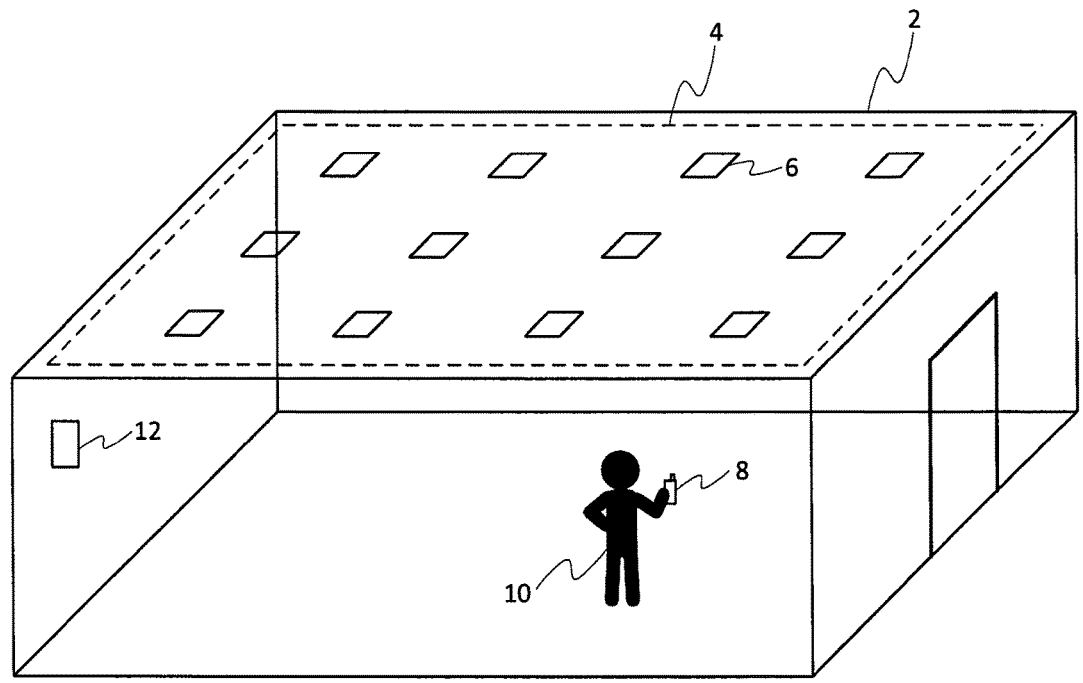
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positing system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations or be dedicated anchor nodes of an indoor positioning system, as long as their locations can still be known. For example the reference nodes could instead be access points 12 of a WLAN or base stations of a cellular purpose used for a secondary purpose of positioning, or could be other mobile devices that have already been, or even satellites of a satellite based positioning system. The following will be described in terms of the reference nodes 6 being anchor nodes of an indoor positioning system or the like, but it will be appreciated this is not necessarily the case in all possible embodiments. Also, while the disclosure is described in terms of wireless radios, the disclosed techniques may be applied to other modalities such as visible light, ultrasound or other acoustic waves, etc.

The environment 2 is occupied by a user 10 having a wireless device 8 disposed about his or her person (e.g. carried or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 12, being or object about which it is disposed.

Figure 2:
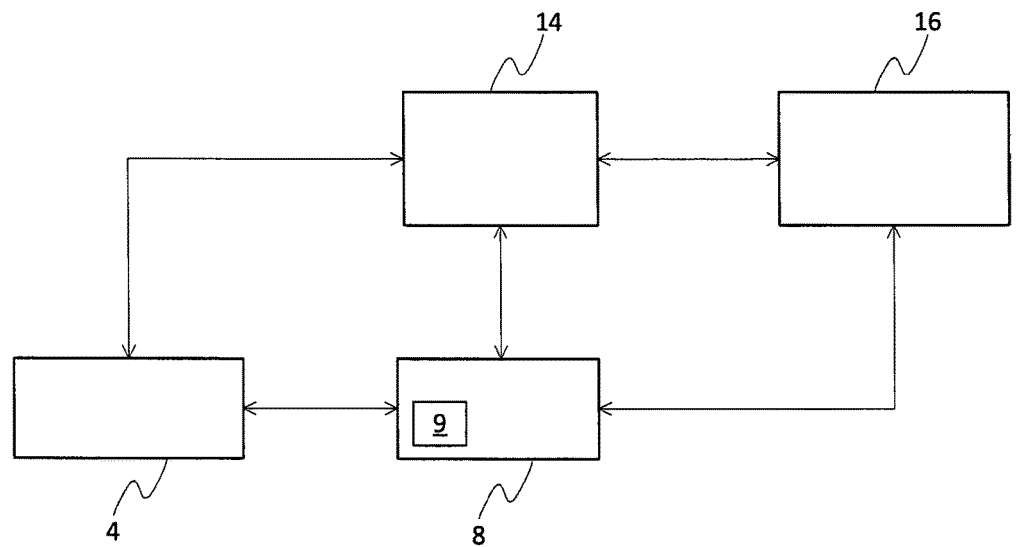
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi or Zigbee, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

The mobile device 8 is also able to communicate via the wireless access point 12 using the relevant radio access technology, e.g. Wi-Fi or Zigbee, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point 12, e.g. Wi-Fi or Zigbee, though that is not necessarily the case in all possible embodiments, e.g. the anchor nodes 6 may alternatively broadcast to the mobile device 8 on some dedicated localization radio technology.

Generally any of the communications described in the following may be implemented using any of the above options or others for communicating between the respective entities 6, 8, 12, 14 and for conciseness the various possibilities will not necessarily be repeated each time.

The mobile device 8 comprises a location module 9 configured to enable the mobile device to operate in accordance with the following. The location module 9 may be implemented in software stored on storage of the mobile device 8 and configured so as when executed on a processor of the mobile device 8 to perform the described operations. Alternatively it is not excluded that some or all of the functionality enabled by the location module 9 may be implemented in dedicated hardware circuitry, or configurable or reconfigurable circuitry.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location. Time-of-flight measurement may be considered a more direct measurement of distance than RSSI measurements, but for methods such as trilateration or multi-lateration the RSSI measurement will be in the end be translated to distances either implicitly or explicitly.

In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In one example of a hybrid approach, the nodes 6 may take the measurements but then send them to the mobile device 8.

There are various options for the manner in which such measurements are started and conducted. For example, either the mobile device may initiate the transmission upon which the measurement is based, or the network may initiate the transmission. Both are possible, but it may have some impact how the rest of the process is implemented, in particular for time-of-flight measurements.

Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (time or time+date) of transmission to the message (and preferably a message hash over the message content to prevent example a malicious party performing replay attack or providing fake message time, e.g. in order to gain unauthorized access). If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement node 6 via another channel (e.g. via location server 14).

Any one or a combination of these approaches or others may be applied in conjunction with the system disclosed herein. Whatever approach is chosen, once such a signal measurement is available from or at each of a plurality of the anchor nodes 6, it is then possible to determine the location of the mobile device 8 relative to the location network 4 using a technique such as trilateration, multilateration, triangulation and/or a fingerprint based technique.

In addition, the "absolute" locations of the anchor nodes 6 (or more generally reference nodes) are known, e.g. from a location database maintained by the location server 14, or by the respective location of each anchor node 6 being stored at the node itself. The absolute location is a physical location of the node in physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 used in the calculation, it is then possible to determine the "absolute" location of the mobile device 8. Again the absolute location is a physical location of the device in physical environment or framework, for example a geographic location in terms of the location on a globe or a map, or a location on a floorplan of a building or complex, or any more meaningful real-world frame of reference having a wider meaning than simply knowing the location relative to the location network 4 alone.

In embodiments, the absolute location of the nodes 6 may thus be stored in a human understandable form and/or the absolute location of the mobile device 8 may be output in a human understandable form. For example, this may enable the user 10 to be provided with a meaningful indication of his or her location, and/or may enable the administrator of a location-based service to define rules for granting or prohibiting access to the service or aspects of the service. Alternatively it is possible for the location of the nodes 6 and/or mobile device 8 to only ever be expressed in computer-readable form, e.g. to be used internally within the logic of the location based service.

In other embodiments it is not excluded that the location is only ever expressed relative to the location network 4, 6 and not as a more meaningful "absolute" location. For example if each anchor node 6 is integrated or co-located with a respective luminaire and the location is being determined for the purpose of controlling those luminaires, then in some embodiments it may only be necessary to determine the user's location relative to the framework of points defined by the anchor nodes of these luminaires (though in other similar arrangements it may still be desired to define lighting control regions relative to the floorplan of a building or the like).

In a device centric approach the mobile device looks up the locations of the relevant nodes 6 by querying the location server 14 (e.g. via the wireless access point 12), or alternatively may receive the respective location along with the signal from each node 6. The mobile device 8 then performs the calculation to determine its own location at the device 8 itself (relative to the location network 4 and/or in absolute terms). In a network centric approach on the other hand, the nodes 6 submit the signal measurements they took to the location server 14 (e.g. via the wireless access point 12), and the location server 14 performs the calculation of the device's location at the server 14 (again relative to the location network 4 and/or in absolute terms). In an example of an assisted or hybrid approach, the mobile device 8 may take the measurements of signals from the nodes 6 but submit them to the location server 14 in a raw or partially processed form for the calculation to be performed or completed there.

Typically a signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

By whatever technique the location is determined, this location may then be used to assess whether the mobile device 8 is granted access to some location-based service or other such function. To this end, there is provided a service access system 16 configured to conditionally grant access to the service in dependence on the absolute location of the mobile device 8. In a device centric approach the mobile device submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

The following are some examples of location-related services or functions that may be provided in accordance with embodiments of the present disclosure:

allowing control of a utility such as lighting from an application running on the mobile device 8, where the user can only control the lighting or utility in a given room or zone when found to be located in that room or zone, or perhaps an associated zone;

providing a navigation service such as an indoor navigation service to the mobile device 8 (in which case the location-related function comprises at least providing the device's absolute location to an application running on the mobile device 8, e.g. which the application may then use to display the user's location on a floor plan or map);

providing location based advertising, alerts or other information to the mobile device 8 (e.g. providing the device 8 with information on exhibits as the user 10 walks about a museum, or information about products as the user 10 walks about a shop or mall); or accepting location dependent payments from the mobile device on condition that the device 8 is present in a certain region, e.g. payments in shops, payment of road tolls, "pay as you drive" car rental, or entrance fees to venues or attractions.

For instance, in embodiments the service access system 16 is configured to control access to a lighting network installed or otherwise disposed in the environment 2. In this case the environment 2 comprises a plurality of luminaires (not shown) and a lighting control system comprising the access system 16. The luminaires may for example be installed in the ceiling and/or walls, and/or may comprise one or more free standing units. The luminaires are arranged to receive lighting control commands from the controller. In embodiments this may also be achieved via the wireless access point 12 using the same radio access technology that the anchor nodes 6 and/or mobile device 8 use to communicate with the wireless access point 12, and/or the same radio access technology used to communicate the signals between the mobile device 8 and anchor nodes 6 in order to take the location measurements, e.g. Wi-Fi or Zigbee. Alternatively the lighting controller may communicate with the luminaires by other means, e.g. a separate wired or wireless network. Either way, the access system 16 of the lighting controller is configured with one or more location dependent control policies. For example, a control policy may define that a user 10 can only use his or her mobile device 8 to control the lights in certain region such as a room only when found within that region or within a certain defined nearby region. As another example control policy, the mobile device 8 only controls those luminaires within a certain vicinity of the user's current location.

With regard to security, provided that the localization messages are distributed internally within the localization system 4, 6, 14 security may be less of an issue; but in the case of two-way time of flight messages (RTT) for example, or where the reports are transmitted over a public network, it may be advantageous to provide them with a time-stamp (measurement time) or a nonce and/or to "hash" the messages (digital signature) so as to thwart any replay attacks on the network backbone. The same could be done with the measurement reports sent to the location server 14. Such measures are not essential but may be desirable in embodiments, particularly if the location-based service or functionality is susceptible to abuse or involves financial transactions or the like.

Note that FIG. 2 shows arrows in all directions to illustrate the possibility of either device centric or network centric approaches, but in any given implementation not all the communications shown need be bidirectional or indeed present at all. Both approaches are described herein by way of comparison. However, the present disclosure is concerned specifically with an at least partially network centric approach in which reference nodes (e.g. anchor nodes) of a location network take measurements of signals received from a mobile device.

Indoor location will be one of the next challenges with significant business potentials. A location network can be deployed to track a mobile's position in a venue or other space or environment. Often such a location network is wirelessly deployed, i.e. anchor nodes in a location network are wirelessly connected to a location server (e.g. via access points 12 and an RF access technology such as Wi-Fi or Zigbee). For example in the future, it is envisaged that lighting control networks will play an important role in that every wireless luminaire or lamp can also serve as an anchor node for the purpose of locating mobile devices, e.g. within the floor of a building. In such a deployment there will be a much higher density of anchor nodes than in current deployments.

Figure 3:
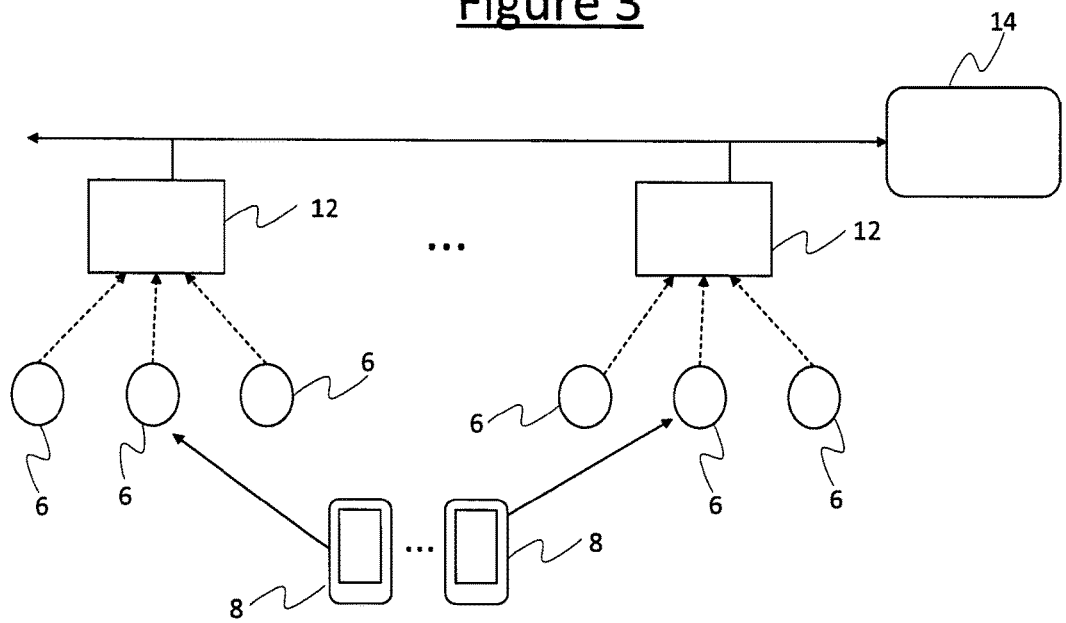
FIG. 3 is a schematic block diagram of a localization system comprising multiple anchor nodes, access points and mobile terminals.

FIG. 3 shows a typical wireless location network, e.g. using a lighting infrastructure as anchor nodes 6. Here the anchor nodes 6 may take the form of lighting luminaires or lamps with built-in or attached wireless radio interfaces.

In FIG. 3, there are a multitude of anchor nodes 6 connected to one or more access points 12. The connections between the anchor nodes 6 and access points 12 allow transfer of data to the location server 14 for location purposes, as well as potentially for other purpose such as lighting control. For example luminaires are fixed in indoor environments and double as anchor nodes 6 (measurement stations) for location purposes. When a mobile device 8 comes into to the venue or space in question, at least some of the anchor nodes 6 pick up transmissions from the mobile 8, and conduct measurements. Such measurements can be for example RSSI (Received Signal Strength Indicator) measurements, time-of-flight, or angle-of-arrival measurements. Whatever type of measurements are conducted, the anchor nodes 6 will transfer the measurement reports to a location server 14 where measurements regarding the mobile device 8 from all relevant anchor nodes 6 are aggregated and analyzed to arrive at an estimate of the position of the mobile device 8.

Traffic multiplication can happen when more than one mobile device 8 is being located by the location network. In this case, the anchor nodes 6 will conduct measurements for every mobile device 8. Furthermore, when a mobile 8 is sending a packet and this packet is being received by a multitude of anchor nodes 6 in the surrounding area, each of the anchor nodes 6 will send out at least one measurement report about the packet that the mobile device sends. If there are N anchor nodes involved in the measurements, N measurement reports are needed for every packet that the mobile device 8 sends. The effect becomes even more pronounced if the density of anchor nodes 6 is high (such as in wireless lighting control networks) or if the anchor nodes 6 are connected in a multi-hop wireless networks fashion, where a measurement report needs to travel multiple wireless links before it reaches a wired connection to the location server 14.

It is recognized herein that multiplication of measurement traffic in a network centric form of a location system has the potential to be a significant issue in terms of inefficient wireless channel bandwidth utilization and traffic congestion.

To address this, it is also recognized that in location systems, the measurements collected by some nodes 6 tend to be more useful in determining the location of a given mobile terminal 8 than others. For example in systems based on received signal strength measurements, typically the stronger signal strength measurements are more useful. To reduce the risk that measurements reports generated by anchor nodes 6 unnecessarily congest the precious wireless bandwidth, the following discloses some examples of a mechanism which prompts only those measurement reports that are of more significance to the localization operation at hand, e.g. measurements with the strongest received signal strengths, or equivalently which suppresses the measurement reports that are of less significance, e.g. measurements with weaker received signal strength.

Figure 6:
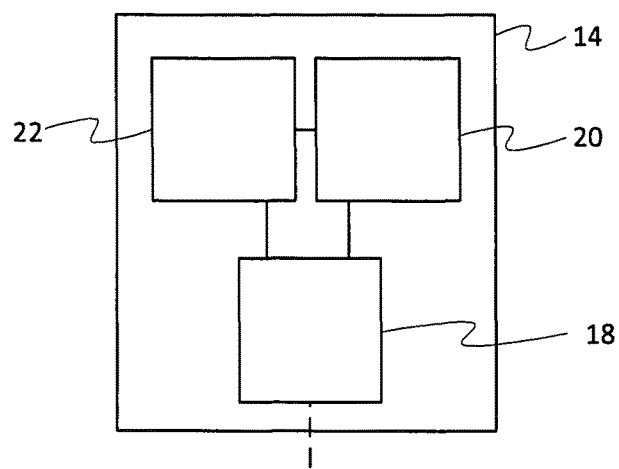
FIG. 6 is a schematic block diagram of a location server.

FIG. 6 illustrates a location server 14 for implementing the mechanism according to embodiments of the present disclosure.

The location server 14 comprises a network interface 18 comprising one or more access technologies. The interface 18 is thereby configured to receive measurement reports submitted from a plurality of anchor nodes 6 of the location network 4, where each measurement report reports a respective a measurement of a signal received by a respective one of the plurality of reference nodes from a respective one of one or more mobile devices 8, the measurement being taken by the respective anchor node 6 (refer again also to FIGS. 1 and 3). Note that where it is said a report is submitted by a respective one of a plurality of reference or anchor nodes, this means a given report is submitted by a given node, but does not exclude that the same node may submit other reports. Similarly wherein it is said a measurement report reports a measurement of a signal received by a reference node from a respective one of one or more mobile devices, this means a given report corresponds to a given mobile device, but does not exclude that other measurement reports may report on a signal received from the same mobile device (by the same or another node). Indeed, it is envisaged that a given node will, over time, submit multiple reports regarding one or more mobile devices, and that numerous mobile devices will be reported on by one or more reference nodes.

In embodiments the signal measurements are received from the anchor nodes 6 wirelessly, the interface 18 of the location server 14 being a wireless interface configured according to a suitable wireless access technology such as an RF access technology, e.g. Wi-Fi or Zigbee (this could be the same or a different technology as used for the signals from the mobile device 8 being measured by the anchor nodes 6 for location purposes). For example each of the interface 18 of the location server 14 may be configured to connect to the anchor nodes 6 and receive the measurement reports from them via the one or more access points 12, e.g. Wi-Fi or Zigbee access points.

The location server 14 also comprises a location module 20 configured to calculate the location of the mobile device 8 (or devices) based on at least some of the corresponding measurement reports received from the anchor nodes 6, e.g. in accordance with any of the localization techniques already discussed above. Furthermore, the location server 14 comprises a node manager 22 configured with a mechanism for controlling whether and/or when (e.g. how often) one, some or all of the anchor nodes 6 submit their respective measurement reports to the location server. The node manager 22 is configured to make a determination as to which of the anchor nodes' 6 reports are considered most relevant—i.e. which are likely to be most useful or worthwhile—and based on this sends out instructions to control which nodes 6 actually allowed to submit reports. Examples will be discussed in more detail shortly. Each of the one, some or all of the anchor nodes 6 is also equipped with a respective instance of a corresponding mechanism for receiving and acting upon the instructions from the node manager 22.

The instructions may be sent from the node manager to the node(s) 6 in question via any suitable interface of the location server 14 and any suitable access technology. For example in embodiments, the instructions may be sent wirelessly via the interface 18 using a wireless access technology such as an RF access technology, e.g. Wi-Fi or Zigbee (which again could be the same or a different technology as used for the signals from the mobile device 8 being measured by the anchor nodes 6 for location purposes, and/or as used to receive the measurement reports from the anchor nodes 6). For example the instructions could also be sent via the one or more access points 12. Alternatively, it is not excluded that the instructions could be sent via separate means, e.g. a wired access technology such as a separate wired network (e.g. Ethernet or I$^2$C bus).

In embodiments the location module 20 and/or node manager 22 may be implemented in software stored on storage of the location server 14 and configured so as when executed on a processor of the location server 14 to perform the described operations. Alternatively it is not excluded that some or all of the functionality enabled by the location module 20 and or node manager 22 may be implemented in dedicated hardware circuitry, or configurable or reconfigurable circuitry of a server 14. Note also that a server as referred to herein does not limit to a single server unit, and the location server 14 could be implemented in one or more server units across one or more physical sites. Further, a processor does not necessarily limit to a single processing unit, and could refer to a multicore processor or distributed processor array.

Figure 7:
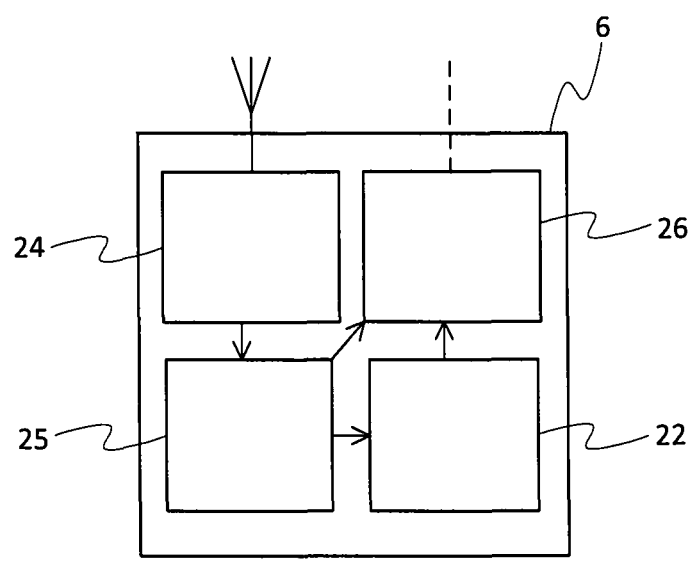
FIG. 7 is a schematic block diagram of an anchor node.

An alternative implementation is shown in FIG. 7. Here, the node manager 22 is not implemented centrally on the location server 14, but in a distributed fashion with an instance of the node manager 22 in each individual anchor node 6.

As shown in FIG. 7, each anchor node 6 comprises a wireless receiver 24 for receiving the signals or signals to be measured from the mobile device or devices 8, and a measurement module 25 coupled to the receiver 24, configured to take the relevant measurement or measurements. The node 6 also comprises a network interface 26 coupled to the measurement module 25, configured to transmit a report or reports of the one or more measurements taken from those signals to the corresponding interface 18 of the location server 14 (all the various options for the access technology as discussed in relation to FIG. 6 are still applicable here). Further, in the distributed implementation, each anchor node 6 comprises an instance of the node manager 22 coupled to the measurement module 25 and interface 26, configured to control the submission of measurement reports via the interface 26 to the location server 14.

Where multiple instance of the node manager 22 run on different anchor nodes 6 to manage the submissions in a distributed fashion, this may be achieved by configuring the node manager 22 on each node with its own set of rules to be followed independently, or by configuring the instances of the node manager 22 on the different anchor nodes 6 to negotiate with one another (any of the above access technologies are again options).

The measurement module 25 and/or node manager 22 may be implemented in software stored on storage of the anchor node 6 and configured so as when executed on a processor of the respective node 6 to perform the described operations. Alternatively it is not excluded that some or all of the functionality enabled by the measurement module 25 and/or node manager 22 may be implemented in dedicated hardware circuitry, or configurable or reconfigurable circuitry.

Whether implemented in a server-based or distributed fashion, the node manager 22 is configured to determine some measure of how relevant it is considered that the anchor nodes' 6 reports will be. There are various options for this. One option is a measure of distance, as nodes 6 that are further away from a mobile device 8 are likely to be less useful in determining the location of that device 8 than nodes that are closer to it. For example the measure or distance may be or be based on the received signal strength of the signal from the mobile device 8 as received at the respective node 6 (e.g. RSSI), or time of flight (ToF) of the signal from the mobile device 8 as received at the respective node 6. Note that in such cases, the measure of relevance may be a measure of the same property as reported in the measurement reports (e.g. RSSI or ToF), or a may be a measure of a different property.

Another other option would be to identify which of a plurality of geographic groups the nodes 6 belong to (e.g. based on zones), or a determination of where anchor nodes 6 are located geographically relative to a predicted path and future location of the mobile device 8 being tracked (e.g. what zone the device is predicted to enter shortly). Another option would be a determination as to whether the reports are considered to be redundant, i.e. the location module 20 already has sufficient reports about a given mobile device 8 in order to be able to locate that device 8 to a certain desired accuracy. Generally, the measure of relevance may be quantitative (e.g. RSSI or ToF), or qualitative (e.g. which group), or a set of constituent measures which may be quantitative, qualitative or a combination of the two.

Given any such measure, the node manager 22 is configured to suppress the submission (to the location server 14) of one or more measurement reports from one or more anchor nodes 6 whose reports are considered less relevant, relative to one or more other of the measurement reports from the same anchor node 6 and/or one or more other anchor nodes 6 whose reports are considered more relevant. Note that to suppress may mean to stop the reports in question, or may mean reducing the number of reports per unit time (e.g. reduce the rate if periodic). Also, suppressing "relative to" could mean making a certain number or rate of reports the default and stopping or lowering the number or rate of reports from the less relevant anchor node(s) 6, or could mean making no reports or a low number or rate of reports the default and then prompting (triggering) reports or extra reports from the more relevant anchor node(s) 6.

There are various possibilities for the relative control of the submission of the different reports. In embodiments, the number or rate of reports is inversely related to the relevance. Inversely relate here just means that of the two variables, an increase in one results in a decrease in the other, and vice versa. Where the measure of relevance is quantitative, this may (but not necessarily) be an inversely proportional relationship. In another option, the node controller 22 may switch on and off anchor nodes 6 depending on which geographic group or zone they belong to.

Some specific examples are set out below, but generally it will be appreciated given the present disclosure that any of the measures of relevance may be used individually or in combination, and may be used with any one or more of the ways of controlling submission of the measurement reports from anchor nodes 6 to the location server 14. Further, any of the techniques described herein may be implemented by a central node manager 22 at the location server 14 (like FIG. 6) or distributed node manager 22 (like FIG. 7).

In a first example embodiment, the anchor nodes 6 apply additional waiting time values (in addition to channel access time) before they send their respective measurement reports. That is, the anchor nodes 6 introduce a delay before sending the measurement report, the delay depending e.g. on the measured RSSI (thus being different from one anchor node to the next). The aim of this mechanism is to avoid that all anchor nodes 6 transmit their respective measurement reports at the same time. The mechanism exploits the observation that anchor nodes will receive a packet from the same mobile device at about the same time with only very small propagation time differences. After receiving the packet, each receiving anchor node 6 selects its own waiting times for reporting. The waiting time values can be chosen in such a way that is in accordance with the importance or weighting of measurement data deemed by a location server 14. An example could be the waiting time values t are inversely related to the received signal strength according to some algorithm (e.g. inversely proportional) since the stronger measurement data are more useful.

The waiting time begins counting down at each receiving anchor nodes 6. In this example, the anchor nodes 6 with the strongest signal strengths will get the chance to transmit their measurement reports first. This is illustrated in FIG. 4.

Figure 4:
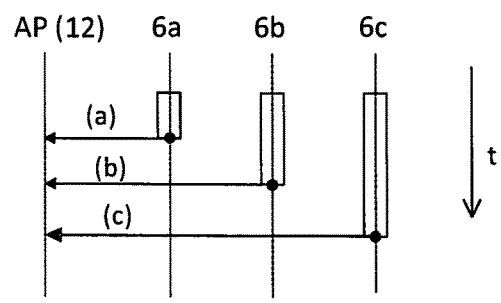
FIG. 4 is a schematic block diagram of a system for controlling measurement reports in a network centric localization system.

In the example of FIG. 4, node 6a has the highest received signal strength measured. Therefore it waits the least amount of time t before it tries to send its measurement report. To do so node 6a needs to start whatever channel access protocol to gain access to the wireless channel. If successful, it transmits its report to the access point 12 (and on to the location server 14). In Wi-Fi networks, the channel access protocol is typically the Distributed Coordination Function.

In a variant of the above, the formula to select report waiting time values may be announced beforehand and can be changed on the fly. In a centralized setting, the location server 14 may announce the formula before it collects measurement reports. In a distributed setting, a first sending anchor node 6 may inform other peer anchor nodes about the formula to be used.

In a second example embodiment, wherein the anchor nodes 6 use RSSI measurements, the RSSI measurements are compared with a threshold. Each measurement report is then only transmitted to the location server 14 if the threshold is exceeded. This takes advantage of the observation that in RSSI-based systems, the strongest measurements are the most useful ones. In variants, other measures could be compared to a threshold, e.g. only reports having a low enough time of flight are transmitted.

In a third example embodiment, anchor nodes 6 may be grouped and transmission of their respective measurement reports may be synchronized (or negotiated between the anchor nodes 6, in a distributed topology) in order to mitigate network congestion.

Figure 5:
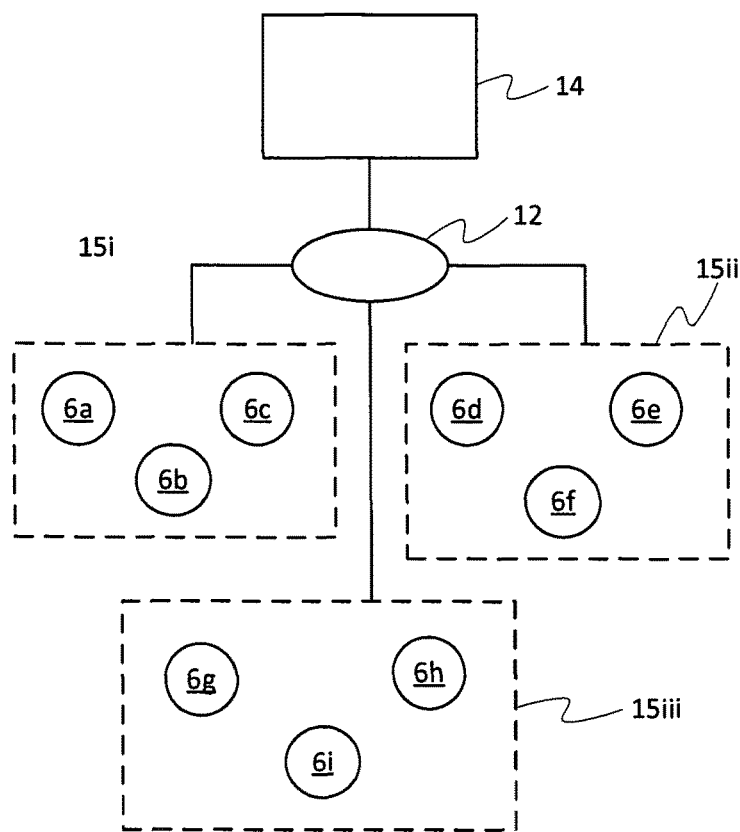
FIG. 5 is a schematic block diagram of another system for controlling measurement reports in a network centric localization system.

This is shown in FIG. 5. Here, the anchor nodes 6 may be grouped according to geographic zone, e.g. nodes 6 in the same room or within a certain proximity of one another being allocated to the same group 15. A centralized or distributed protocol may then me implemented to reduce measurement reports, such that anchor nodes 6 in a particular group or groups but not the others. In a centralized setting, the location server 14 may announce beforehand which group of anchor nodes 6 may send measurement reports. In a distributed setting, anchor nodes 6 decide among themselves according to the first measurement reports that are sent on to the air. For example, if node 6a sends first, then only the anchor nodes 6b, 6c that belong to the same group 15i as node 6a may continue sending.

Note that in one version of the third example embodiment, the first sending node 6a may be determined in accordance with the first example embodiment. I.e. the node 6 with the highest received signal strength or lowest time of flight (and therefore who is closest to the mobile device 8 in question) sends its report first. Then, only the nodes 6b and 6c in the same group 15i as that node 6a transmit their reports, while the nodes 6d-bi in the other groups 15ii, 15iii do not send their reports.

In a fourth example embodiment, upon gathering sufficient measurement reports the location server 14 may instruct anchor nodes 6 (e.g. via the access point 12) to stop sending measurement reports for a particular packet from the mobile device 8. Alternatively, the location server 14 announces how many measurement reports it wishes to receive or further receive, and the anchor nodes 6 keep track of whether the required number of measurements reports have already been sent out. If so, the remaining anchor nodes 6 that have not sent out their measurement reports will cancel the sending of their own report(s). In a distributed setting, anchor nodes 6 may coordinate and inform the others by using broadcasts about the composition of group of anchor nodes 6 who may send further measurement reports. Or alternatively, anchor nodes 6 may decide for themselves based on the measurement reports that they overhear. For example, if there are more than a certain number of measurement reports have been sent already, then the rest of the anchor nodes 6 may decide to refrain from sending.

In a fifth example embodiment, the location server 14 may instruct certain anchor nodes 6 to refrain from sending updates for a certain time period, depending on the already received measurements and optionally on the estimated near-future location of the mobile device 8. For example, if it is estimated that a mobile device 8 will enter a new zone, the location server 14 may instruct anchor nodes 6 from previous zones to refrain from sending measurement reports.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
   a location server comprising a network interface for receiving a plurality of measurement reports submitted from a plurality of reference nodes of a location network, each of the plurality of measurement reports reporting a measurement of a signal received by a respective one of the plurality of reference nodes from a respective one of one or more mobile devices;

a localization module configured to determine a location of the one or more of the mobile devices based on at least some of said plurality of measurement reports; and a node manager configured to control whether and/or when one or more of said plurality of measurement reports are submitted from one or more of the plurality of reference nodes, in dependence on a measure of relevance to said determination of the location of the one or more of the mobile devices;

wherein said control by the node manager comprises: controlling a time at which one or more of the measurement reports are submitted to the location server, the time depending on the measure of relevance so as to be staggered in time relative to the submission of one or more others of the measurement reports, and wherein controlling said time comprises: delaying the time at which one or more of the measurement reports are submitted, the delay being inversely related to the measure of relevance.

2. The system of claim 1, wherein the delay is inversely proportional to the measure of the relevance.

3. The system of claim 1, wherein said control by the node manager comprises: suppressing the submission of the measurement reports from ones of said reference nodes for which the measure of relevance is not outside of a threshold.

4. The system of claim 1, wherein the measure of relevance comprises a measure of distance of the respective reference node from the respective mobile device.

5. The system of claim 4, wherein the measure of distance comprises signal strength or time of flight.

6. The system of claim 1, wherein the reference nodes are divided into geographical groups, and said measure of relevance comprises an identification as to which group the respective reference node belongs to.

7. The system of claim 6, wherein the control by the node manager comprises: determining a most relevant one of said reference nodes, identifying the geographic group of said most relevant reference node, and suppressing the submission of the measurement reports from reference nodes not belonging to the identified group, relative to the measurement reports from the reference nodes that do belong to said identified group.

8. The system of claim 6, wherein the measure of relevance comprises both a measure of distance of the respective reference node from the respective mobile device and the identification of geographic group; the control by the node manager comprising: determining a closest one of said reference nodes based on the measure of distance, identifying the geographic group of said closest reference node, and suppressing the submission of the measurement reports from reference nodes not belonging to the identified group relative to the measurement reports from the reference nodes of said identified.

9. The system of claim 1, wherein the measure of relevance comprises determining that the location module already has a sufficient number of said measurement reports to determine the location of one of said one or more mobile devices to a desired accuracy, the control by the node manager comprising: in response to determining that the location module has the sufficient number of measurement reports, suppressing the submission of subsequent ones of said measurement reports reporting measurements of signals from said one of the mobile devices.

10. The system of claim 1, wherein the node manager is configured to predict a path and thereby a future location of one of said one or more mobile devices, the measure of relevance comprising a measure of relevance to the future location and the node manager being configured to perform said control in dependence on the measure of relevance to the future location.

11. The system of claim 1, wherein the measurement reports are submitted from the reference nodes to said interface of the location server over a wireless network, said control by the node manager being to control the submission over the wireless network.

12. A computer program product for use in relation to a location network where a plurality of measurement reports can be submitted from a plurality of reference nodes to a location server, each of the plurality of measurement reports reporting a measurement of a signal received by one of the plurality of reference nodes from one of one or more mobile devices, and where the location server determines a location of the one or more of the mobile devices based on at least some of said plurality of measurement reports;

wherein the computer program product comprises code embodied on a non-transitory computer readable storage medium and configured so as when executed on the location server or one or more of the reference nodes to perform operations of: controlling whether and/or when one or more of said plurality of measurement reports are submitted from one or more of the plurality of reference nodes, in dependence on a measure of relevance to said determination of the location of one or more of the mobile devices, wherein said control comprises: controlling a time at which one or more of the measurement reports are submitted to the location server, the time depending on the measure of relevance so as to be staggered in time relative to the submission of one or more others of the measurement reports, and wherein controlling said time comprises: delaying the time at which one or more of the measurement reports are submitted, the delay being inversely related to the measure of relevance.

13. One of a plurality of reference nodes for use in a location network where a plurality of measurement reports can be submitted from the plurality of reference nodes to a location server, each of the plurality of measurement reports reporting a measurement of a signal received by one of the plurality of reference nodes from one of one or more mobile devices, and where the location server determines a location of one or more of the mobile devices based on at least some of said plurality of measurement reports;

wherein said one of the reference nodes comprises a node manager configured to control whether and/or when one or more of the plurality of measurement reports are submitted from said one of the reference nodes, in dependence on a measure of relevance to said determination of the location of one or more of the mobile devices, wherein said control by the node manager comprises: controlling a time at which one or more of the measurement reports are submitted to the location server, the time depending on the measure of relevance so as to be staggered in time relative to the submission of one or more others of the measurement reports, and wherein controlling said time comprises: delaying the time at which one or more of the measurement reports are submitted, the delay being inversely related to the measure of relevance.

* * * * *